US006749504B2

(12) United States Patent
Hughs-Baird

(10) Patent No.: US 6,749,504 B2
(45) Date of Patent: Jun. 15, 2004

(54) GAMING DEVICE HAVING MULTIPLE SELECTION LARGE AWARD BONUS SCHEME

(75) Inventor: Andrea C. Hughs-Baird, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/155,788

(22) Filed: Aug. 20, 2002

(65) Prior Publication Data

US 2003/0045349 A1 Mar. 6, 2003

Related U.S. Application Data

(63) Continuation of application No. 09/686,284, filed on Oct. 11, 2000.

(51) Int. Cl.[7] .................................................. A63F 13/00
(52) U.S. Cl. .......................... 463/25; 463/20; 273/138.1
(58) Field of Search .......................... 463/1, 2, 7, 9–13, 463/16–21, 25, 26, 30, 31, 35–38; 273/138.1, 139, 236, 237, 143 R, 292, 242

(56) References Cited

U.S. PATENT DOCUMENTS 4,874,173 A 10/1989 Kishishita
5,609,524 A 3/1997 Inoue
6,155,925 A 12/2000 Giobbi et al.
6,186,893 B1 2/2001 Walker et al.
6,227,970 B1 5/2001 Shimizu et al.

FOREIGN PATENT DOCUMENTS

EP 0984409 A2 * 8/2000 ........... G07F/17/32

OTHER PUBLICATIONS

Human Factors Design Guide, DOT/FAA/CT–96/1 (Jan. 1996), pp. 8–4 to 8–76.*

* cited by examiner

*Primary Examiner*—Mark Sager
*Assistant Examiner*—Steven Ashburn
(74) *Attorney, Agent, or Firm*—Bell, Boyd & Lloyd LLC

(57) ABSTRACT

A gaming device including a plurality of selections, a plurality of credit symbols associated with the selections, a plurality of awards symbols associated with the selections, and a winning combination of award symbols. A player is awarded credits when the player selects a selection having an associated credit symbol and player accumulates award symbols when the player selects a selection associated with an award symbol. The player wins a preferably large award when the player accumulates said winning combination of award symbols. The number of player selections is determined based on the player's wager in the primary game wherein the player obtains a specified number of player selections which are necessary to achieve the winning combination and thereby win the large award.

16 Claims, 16 Drawing Sheets

GAMING DEVICE HAVING MULTIPLE SELECTION LARGE AWARD BONUS SCHEME

PRIORITY CLAIM

This application is a continuation of and claims the benefit of U.S. patent application Ser. No. 09/686,284, filed Oct. 11, 2000.

CROSS-REFERENCE TO RELATED APPLICATIONS

This application is related to the following commonly-owned patent applications: "GAMING DEVICE HAVING BONUS SCHEME WITH MULTIPLE SELECTION GROUPS," Ser. No. 09/656,702, now U.S. Pat. No. 6,439, 995; "GAMING DEVICE HAVING A BONUS SCHEME INCLUDING A PLURALITY OF SELECTION GROUPS WITH WIN-GROUP OUTCOMES," Ser. No. 09/981,084, "GAMING DEVICE HAVING A BONUS SCHEME WITH MULTIPLE SELECTION GROUPS." Ser. No. 10/243,047, "GAMING DEVICE HAVING A BONUS SCHEME WITH MULTIPLE SELECTION GROUPS," Ser. No. 10/195,292, "GAMING DEVICE WITH PRIZE BONUS SCHEME HAVING MULTIPLE AWARD LEVELS." Ser. No. 09/602, 140, "GAMING DEVICE WITH BONUS SCHEME PROVIDING INCREASED REWARD FOR SELECTING RELATED SYMBOLS," Ser. No. 09/605,023, "GAMING DEVICE HAVING A MULTIPLE SELECTION GROUP BONUS ROUND," Ser. No. 09/605,107, now U.S. Pat. No. 6,511,573; "APPARATUS AND METHOD FOR MODIFYING GENERATED VALUES TO DETERMINE AN AWARD IN A GAMING DEVICE," Ser. No. 09/957,018, "GAMING DEVICE HAVING A MULTIPLE SELECTION GROUP BONUS ROUND," Ser. No. 10/327,538, "GAMING DEVICE HAVING MULTIPLE CHOICE LARGE AWARD BONUS SCHEME." Ser. No. 09/686,284, "GAMING DEVICE HAVING RELATED MULTI-GAME BONUS SCHEME," Ser. No. 09/688,972, "IMAGE MATCHING GAME," Ser. No. 09/395,034, "GAMING DEVICE HAVING A MULTIPLE SELECTION AND AWARD DISTRIBUTION BONUS SCHEME," Ser. No. 09/688,635, and "GAMING DEVICE HAVING AN ELEMENT AND ELEMENT GROUP SELECTION AND ELIMINATION BONUS SCHEME," Ser. No. 09/689,381.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a multiple selection large award bonus scheme for increasing player enjoyment and excitement.

BACKGROUND OF THE INVENTION

Gaming machines currently exist with mechanical or video reels having symbols thereon and bonus schemes in which a player has one or more opportunities to select one or more symbols from a group of symbols to receive credits or bonus values. Such gaming devices which enable players to select symbols from a group of symbols are well known. Since players are seeking more entertainment and enjoyment, it is desirable to provide players with new gaming devices with new bonus schemes, enabling players to win larger payouts while simultaneously entertaining the players.

SUMMARY OF THE INVENTION

The present invention provides players with an opportunity to win a large payout while being entertained, by providing a gaming device and method having a multiple selection bonus scheme. A symbol is associated with each selection and the game conceals or masks which symbol is associated with each selection. When a player makes a selection, the game exhibits the symbol associated with the selection using a display device.

Most of the symbols are preferably credit symbols which provide credits to the player when selected by the player. The credit symbols may have the same or different values. At least one and preferably a plurality of symbols are award symbols. The player must obtain all or a predetermined number of the award symbols to win the large award or jackpot. It should be appreciated that the bonus scheme of the present invention preferably includes award symbols that have additional or multiple functions such as providing the player with a number of credits. It should also be appreciated that the bonus scheme may include other functional symbols (for example, credit multiplier or pick again symbols).

In one embodiment, whenever the player selects a credit symbol, the game awards the player with credits or a bonus value associated with that credit symbol and then continues the bonus round. When the player selects an award symbol, the game accumulates the award symbols, and if appropriate, implements any additional function associated with the award symbol (i.e., such as enhancing the player's total award or granting the player another pick). In the preferred embodiment, the game provides credits to the player for obtaining an award symbol.

In a preferred embodiment the player chooses all of the symbols and then presses a selection confirmation indication to reveal the symbols. The bonus scheme of the present invention preferably determines the number of player picks or selections available to the player during the bonus round based on the player's wager in the primary round. If the player's wager is equal to or above a predetermined limit (preferably the maximum wager) the game provides the player with an appropriate number of selections in the bonus round which will provide the player an opportunity to win the large award or jackpot. If the player did not wager at or above the predetermined limit, the game does not provide the player with an appropriate number of selections necessary to win the large award or jackpot.

In operation, a player makes a selection. If the game exhibits a credit symbol, preferably the game awards the player with a credit value. As long as the player has picks remaining, the player makes another selection. If any of the exhibited symbols are award symbols, the game accumulates the award symbols. If the player selects an award symbol, the game also implements any additional function associated with that symbol. This process continues until the player ultimately uses all his picks or obtains enough symbols to win the large award or jackpot.

It is therefore an object of the present invention to provide a gaming device with a multiple selection bonus scheme.

It is a further object of the present invention to provide a gaming device with a multiple selection bonus scheme which provides players with opportunities to win a large award.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
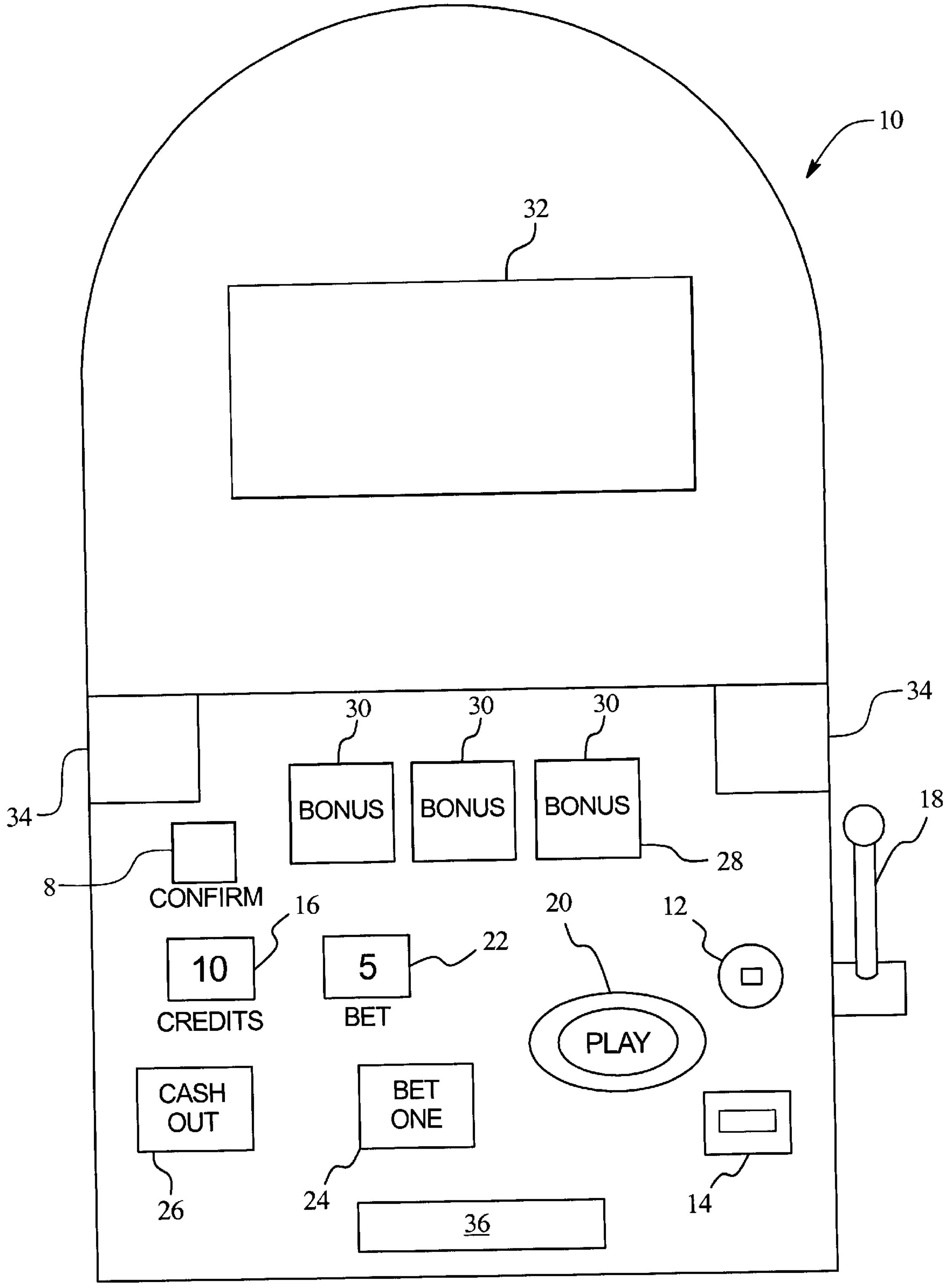
FIGS. 1A and 1B are front plan views of one embodiment of the gaming device of the present invention.

Referring now to the drawings, a gaming device 10 of one embodiment of the present invention, which is preferably a slot machine having the controls, displays and features of a conventional slot machine is generally illustrated. Gaming device 10 is constructed so that a player can operate gaming device 10 while standing or sitting. However, it should be appreciated that gaming device 10 can be constructed as a pub-style tabletop game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno in addition to any of their bonus triggering events which trigger the gaming scheme of the present invention. In the preferred embodiment, the gaming device 10 incorporates a gaming scheme including a primary game and a secondary or bonus game. However, it should be appreciated that the gaming device 10 includes a primary game while the gaming scheme comprises only the secondary game. The symbols and indicia used on and in gaming device 10 may be in mechanical, electrical or video form. In one embodiment the primary game uses symbols and indicia in mechanical form and the secondary game includes only symbols in video form. It is also anticipated that the symbols in both the primary and secondary game are in video form.

Figure 1B:
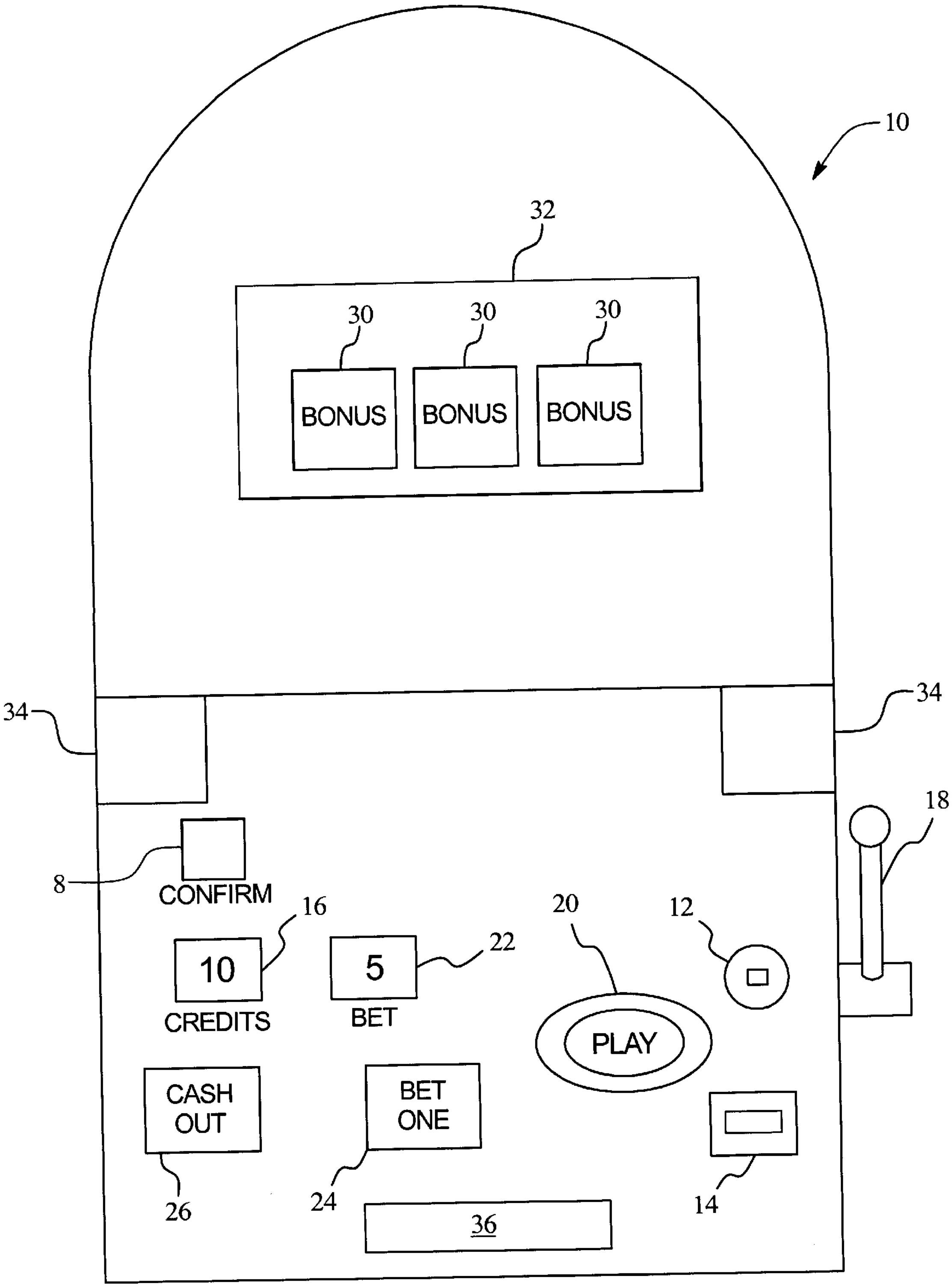

As illustrated in FIGS. 1A and 1B, gaming device 10 includes a coin slot 12 and bill acceptor 14 where the player inserts money, coins or tokens. The player can place coins in the coin slot 12 or paper money in the bill acceptor 14. Other devices could be used to accept payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism (including a touch screen) which starts the game.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably two to five reels in mechanical or video (i.e., virtual) form. Each reel 30 displays a plurality of indicia such as bells, hearts, fruits, numbers, letters, bars or other images which preferably correspond to a theme associated with the gaming device 10. Each symbol may be associated with an audio representation provided through speakers 34. If the reels 30 are in video or virtual form, the gaming device 10 preferably displays the video reels 30 at display 32 instead of at display window 28 (best viewed in FIG. 1B).

The display 32 is selected from the group consisting of cathode ray tubes "CRTs", high resolution flat panel LCDs, projection type LCDs, plasma displays, field emission displays, digital micromirror displays, LCD touch-screens, flat TV displays or other suitable displays. The display 32 is capable of portraying or displaying images, symbols and other indicia including images of people, characters, places, things and card faces associated with the game. This display 32 (and speakers 34) generally attract patrons to play the game.

In one preferred embodiment, the display 32 is an LCD which is used to display images, symbols and other indicia including secondary games which represent a bonus game (a secondary game for which a bonus is awarded to the primary game). It should be appreciated that the display window 28 containing reels 30 and display 32 could be combined into one display so that the display 32 provides the reels 30 only in video or virtual form along with the images, symbols and other indicia of the gaming device 10 for both the primary and secondary games (best viewed in FIG. 1B). Furthermore, a plurality of smaller displays could combine to form display 32 used with the present invention.

At any time during the primary game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
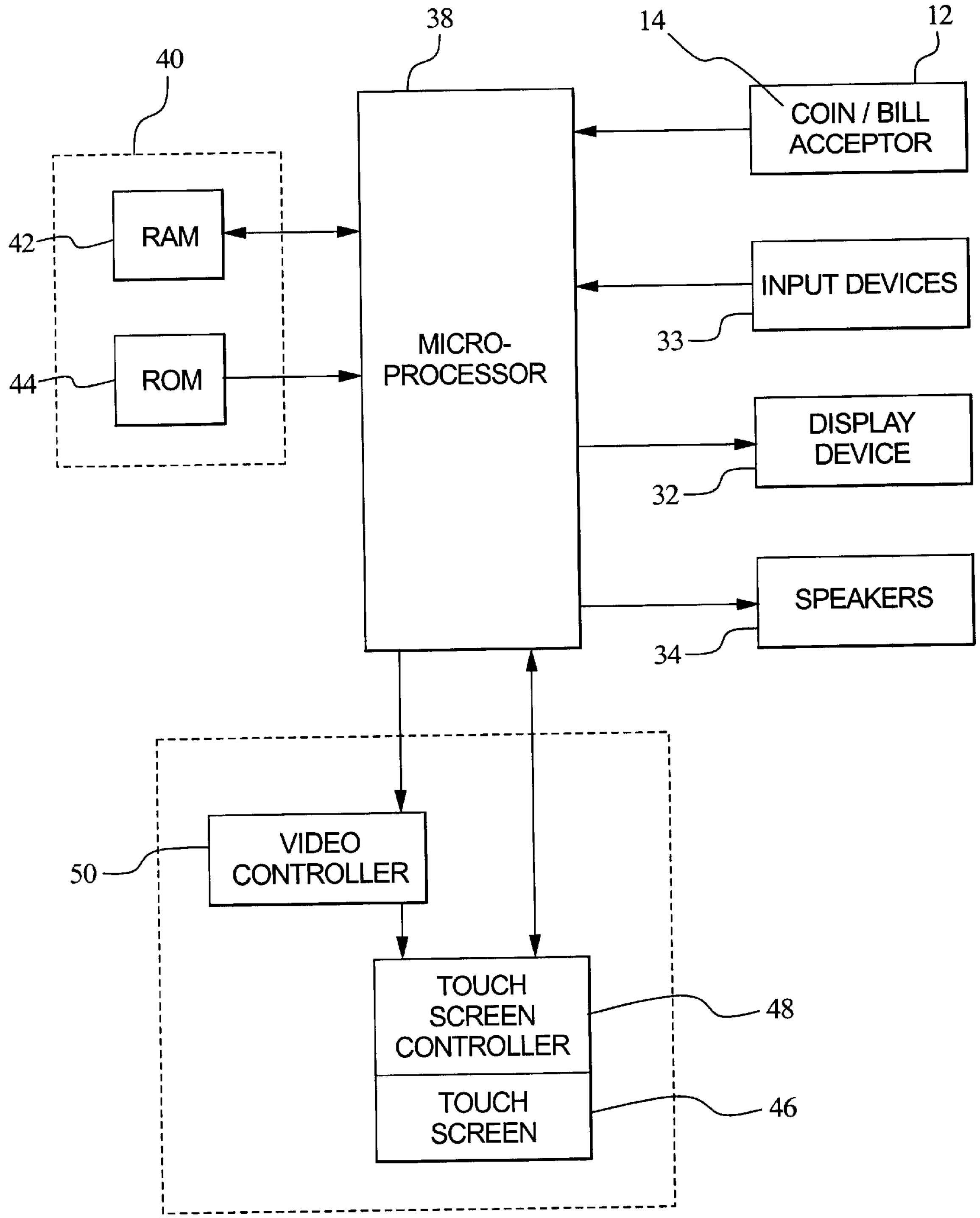
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 38, a memory device 40 for storing program code or other data, a display 32 or other display device (i.e., a liquid crystal display) and at least one input device such as play button 20. The processor 38 is preferably a microprocessor or microcontroller-based platform which is capable of displaying images, symbols and other indicia such as images of people, characters, places, things and faces of cards. The processor 38 also provides the interaction between the images, symbols and other indicia, generally in cartoon form. The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with an applicable game scheme and any applicable pay tables.

The player preferably uses input devices 33 (comprising play button 20 or arm 18) as illustrated in FIG. 2, to input signals into gaming device 10. Furthermore, it is anticipated that gaming device 10 could include a touch screen 46 and an associated touch screen controller 48 if the game requires input or a selection by the player. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although the processor 38 and memory device 40 are preferable implementations of the present invention, the present invention can also be implemented using one or more application-specific integrated circuits (ASIC's) or other hard-wired devices, (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10, the player must insert the appropriate amount of money or tokens at coin slot 12 or bill acceptor 14 and then activate the input device 33 (i.e., pull the arm 18 or push the play button 20). The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, preferably gaming device 10 also provides players the opportunity to win credits in the secondary or bonus round. It should be anticipated that while the present invention is in regards to a bonus round, it is equally applicable to a primary game. This type of gaming device 10 includes a program which automatically begins a secondary or bonus round (i.e., the gaming scheme") when the player has achieved a qualifying condition in the primary game. This qualifying condition can be a particular arrangement of indicia on the display window 28. Preferably, the qualifying condition is a predetermined combination of indicia appearing on a plurality of reels 30. As illustrated in the three reel slot game shown in FIGS. 1A and 1B, the qualifying condition could be the text "BONUS" appearing in the same location on three adjacent reels during the primary game or the text "BONUS" on one reel and a predetermined bet in the primary game.

Bonus Scheme

Figure 3A:
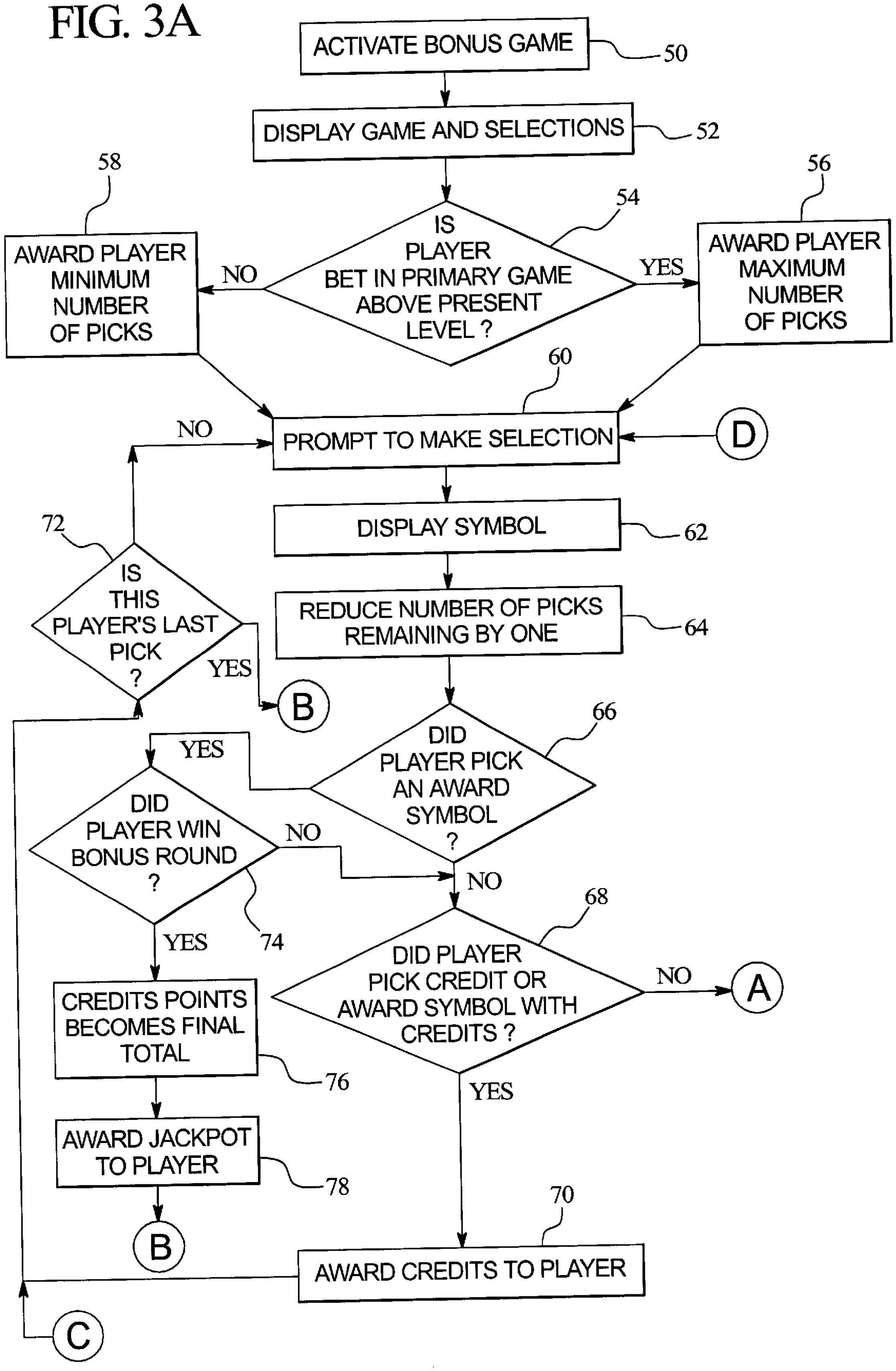
FIGS. 3A and 3B are flow diagrams of one embodiment of the multiple selection large award bonus scheme of the present invention.

If a player achieves a bonus triggering or qualifying condition when playing the primary game, the game or gaming device 10 automatically begins or initiates the bonus round of the present invention as indicated by block 50 in FIG. 3A.

Figure 4A:
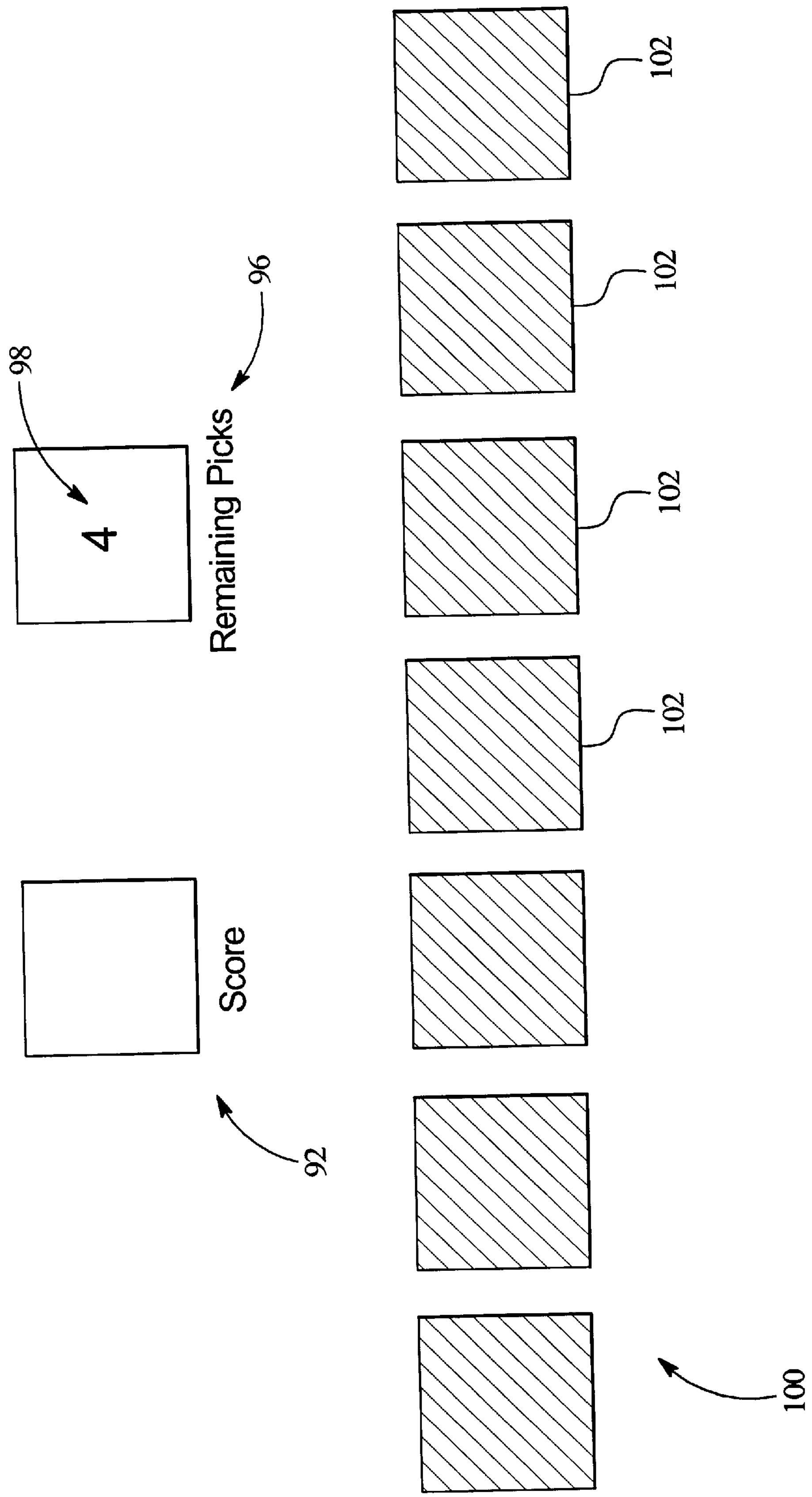
FIGS. 4A, 4B and 4C are schematic diagrams illustrating one embodiment of the bonus scheme of the present invention.

The game displays a plurality of selections on display 32 as indicated by block 52. The selections may be images consisting of various graphics and having various sizes, shapes and colors. In one embodiment of the present invention, the selections are squares in a linear format as illustrated in FIG. 4A. It should be appreciated that the selections may be spaced apart in an orderly or disorderly arrangement.

The gaming device determines whether the player's wager or bet is above a preset or predetermined level as indicated by diamond 54. If the player's bet is above the predetermined or preset level, the game provides the player with a maximum number of player picks as indicated by block 56. If the player's bet in the primary game is below the preset level, the gaming scheme provides the player with a minimum number of player picks as indicated by block 58. In a preferred embodiment having fifty-four selections, if the player's bet is above the preset level, the gaming scheme provides the player with seven player picks, otherwise the player is provided with six picks. In this embodiment, to obtain the jackpot, a player must select seven award symbols as discussed below. Thus, in the preferred embodiment of the present invention, to have an opportunity to win the jackpot, the player must make a wager above the preset limit to obtain a sufficient number of picks to win the large award.

It is anticipated that a step arrangement employing more than one predetermined limit may be used to determine the player picks. For example, the game could use three predetermined limits, where if the bet in the primary game is at or below a first predetermined level, the game provides the player the minimum number of picks (e.g., 5 picks), if above the first but below a second predetermined level the game provides an intermediate number of picks (e.g., 6 picks) and if at or above a third level, the game provides the player a maximum number of picks or a number of picks needed to win the large award (e.g., 7 picks).

The gaming device prompts the player to make a selection as indicated by block 60. After reviewing the plurality of selections, the player chooses one selection, preferably by touching touch screen 46 (illustrated in FIG. 2) which displays the selected symbol, as indicated by block 62 in FIG. 3A. In one embodiment, each time a player makes a selection, the game exhibits the symbol associated with that selection. In an alternative preferred embodiment, the player makes all of the selections and then the game exhibits the symbol associated with the selections. In another alternative embodiment, the player makes all of the selections, presses a selection confirmation indication 8 as seen in FIGS. 1A and 1B and then the game exhibits the symbol associated with the selections. The gaming device 10 reduces the number of picks by one after the player makes a selection as indicated by block 64

When a particular number of award symbols are selected by the player or alternatively when the award symbols are selected in a particular order or arrangement, the player wins the large award. The award symbols necessary to win the large award are referred to as the "award combination." Preferably, the award symbols in the award combination have identical characteristics or are grouped by the nature of those characteristics. For example, the winning combination could consist of: (i) symbols having the same credit (i.e., seven symbols, wherein each symbol is a 10 credit point symbol; (ii) symbols belonging to a predetermined set (i.e., seven symbols, wherein one symbol is a 10 credit point symbol, one symbol is a 20 credit point symbol; one symbol is a 30 credit point symbol, etc.); (iii) symbols belonging to a predetermined set and selected in a predetermined order (i.e., seven symbols, wherein first the 10 credit point symbol is selected, then the 20 credit point symbol is selected; the 30 credit point symbol is selected, etc.); (iv) symbols related by shape (i.e., pyramids or circles); (v) symbols related by color; (vi) symbols having one or more sounds (i.e., a trumpet or a piano), etc.

In the preferred embodiment, the game awards a credit value to the player each time the player locates an award symbol in addition to accumulating said award symbols (for example, the game may award fifty credits for each award symbol selected by the player). It should also be appreciated that the game may award different credits for different award symbols (i.e., fifty credits for one pyramid and twenty credits for another pyramid). These credits can vary from symbol to symbol and preferably increases as the bonus round is played.

Figure 3B:
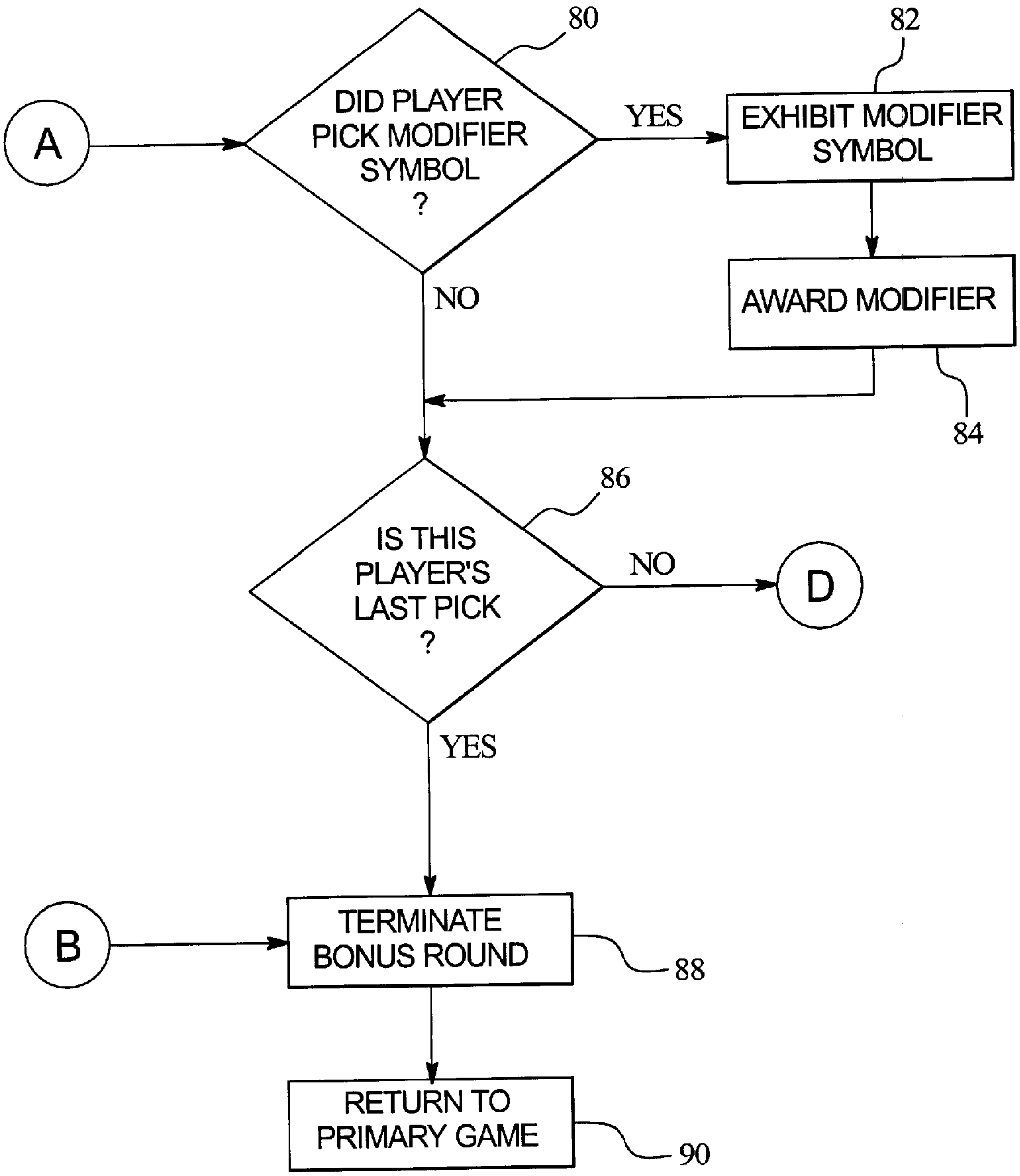

Referring back to FIG. 3A, the game determines if the player selected an award symbol as indicated by diamond 66. If the player did not select an award symbol, the game determines if the player selected a credit or award symbol with credits as indicated by block 68. If the player selected a symbol with credits, the game awards the credits to the player as indicated by block 70 and determines whether this is the player's last pick (i.e., whether the player has any remaining picks) as indicated by diamond 72. If this is not the player's last pick, the game prompts the player to make another selection as indicated by block 60 and the game continues. If the player does not have any picks remaining, the bonus round terminates as indicated by block 88 in FIG. 3B. In one preferred embodiment, the bonus round returns the player to the primary game as indicated by block 90, however the game may terminate both the bonus and the primary game.

If the player selected an award symbol, preferably the game determines if the player won the bonus round as indicated by block 74. If the player obtained the award combination, the credit points become the final total as indicated by block 76 and the player is awarded a jackpot as indicated by block 78. Preferably, the bonus round is then terminated as indicated by block 88. Preferably, the jackpot is a large sum such as one million dollars. It should be appreciated that if the winning combination requires a number of award symbols equal to the number of player selections, all of the player selections must be award symbols to obtain the large award. In such case, if the player selects any credit symbol, the player can no longer win the large award.

The gaming scheme of the present invention may further include award symbols without credits or other functional symbols for rewarding the player during the bonus round. For instance, if the player does not select a symbol with associated credit points as indicated by diamond 68, the selected symbol may be a modifier which enhances the player's credits as discussed in greater detail below. In the depicted embodiment, the game determines if the player selected a symbol which is a modifier as indicated by diamond 80. If the player selected the modifier symbol, the game displays the modifier symbol and uses the modifier to modify the player's credits as indicated by blocks 82 and 84. The modifier may be a multiplier or any other variation, and may be a bonus pick or other option for the player.

If the player did not select a modifier symbol, the game determines whether this is the player's last pick as indicated by diamond 86. If this is not the player's last pick, the game prompts the player to make the selection as indicated by block 60 and the game continues. If this is the player's last pick, the game terminates the bonus round as indicated by block 88. It is anticipated that one embodiment of the bonus rounds skips the decision indicated by diamond 80. In that embodiment, if the player did not select the award or credit symbols, then the player could only have selected a modifier symbol and the game functionally provides the modifier.

The bonus scheme of the present invention offers a heightened level of excitement to players because the player does not know what is hidden by each selection and the player preferably has an opportunity to win a large jackpot such as $1,000,000. When the player chooses a selection, the player is faced with several possible outcomes: (i) the player could earn credits; (ii) the player could select an award symbol which accumulates towards the winning combination (and which preferably provides the player with additional credits); or (iii) could obtain a modifier symbol such as an extra pick or multiplier of the credits that the player earns in the bonus round.

One preferred embodiment of the present invention includes credit symbols having various credit values and award symbols which are identical in appearance.

Figure 4B:
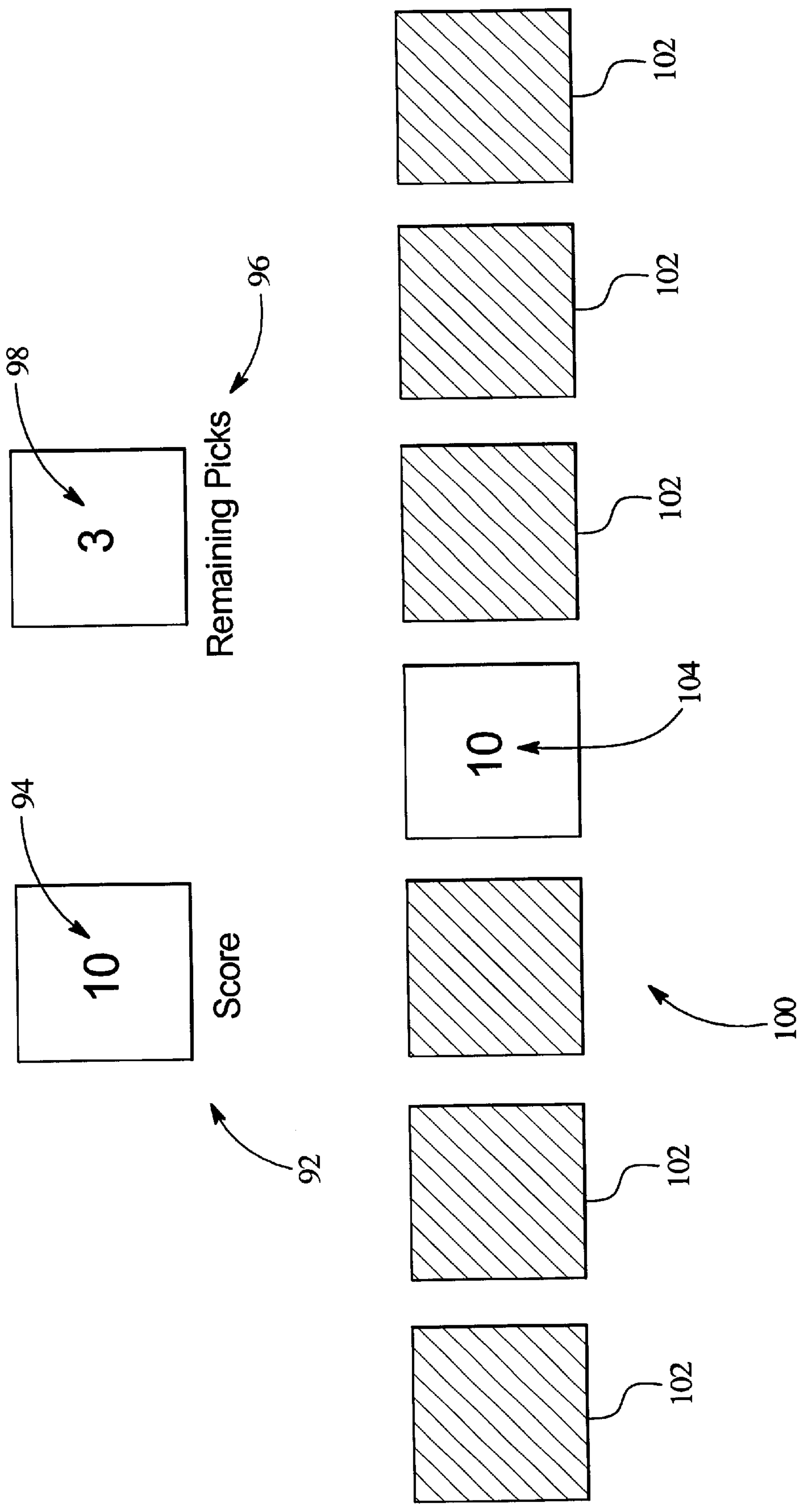
Figure 4C:
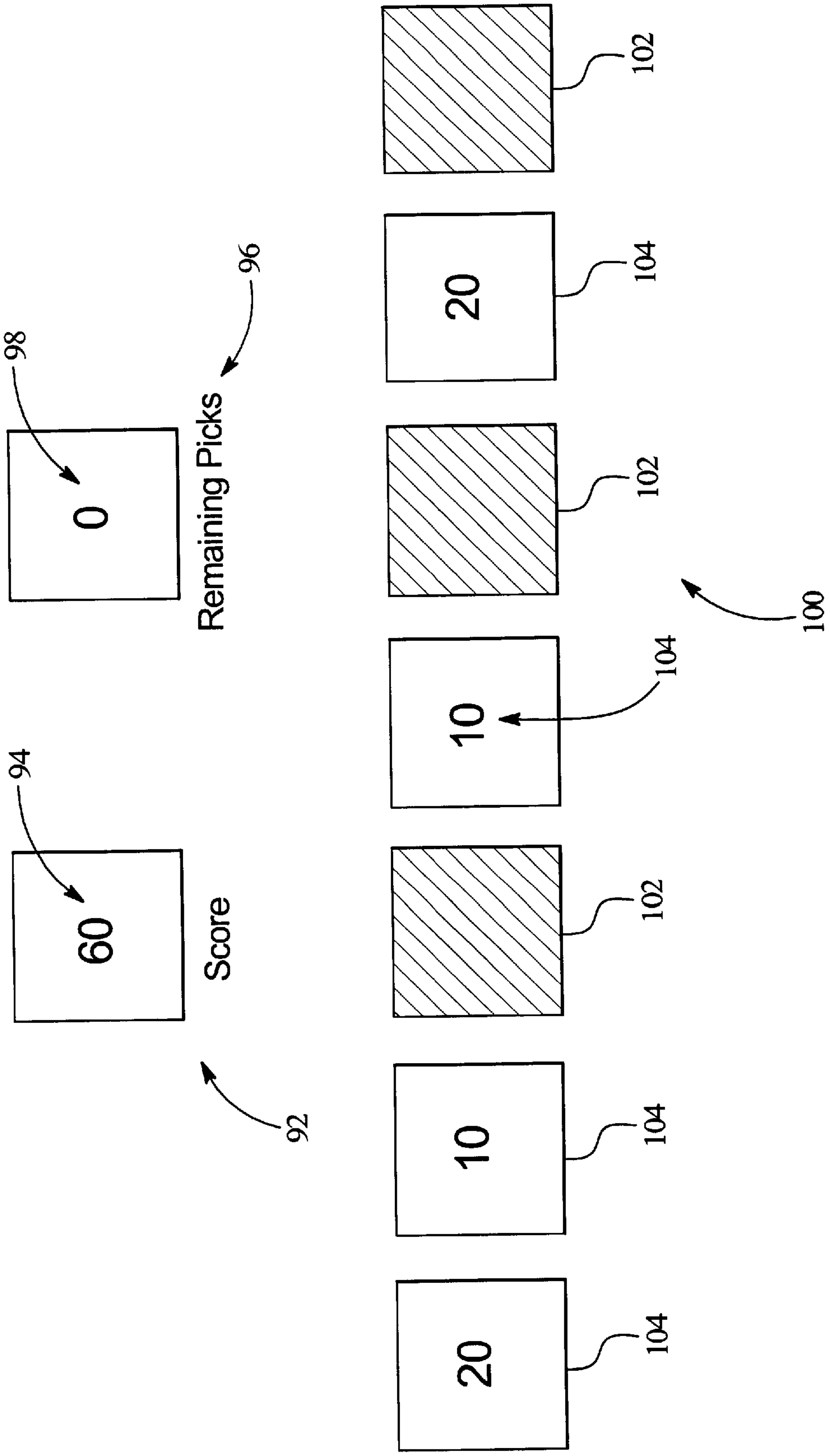

One embodiment of the bonus scheme is illustrated in FIGS. 4A through 4C. The scheme includes a plurality of display areas or displays preferably provided by display 32 (see FIG. 2.) The displays preferably include: (i) a credit display 92, which exhibits the player's current credits; (ii) a remaining picks 96 display which exhibits the number of picks remaining to the player; and (iii) the selection display 100, which displays the selections 102 and different types of symbols 104.

In this embodiment, the selection display 100 exhibits a plurality of selections 102 (seven total selections are displayed), displaying the plurality of selections in a linear manner, that is the squares are set forth in a line as illustrated in FIG. 4A. It should be appreciated that other manners of displaying the selections 102 are contemplated, including displaying the plurality of selections 102 in a grid, a circle, a pyramid, etc.

The purpose of the game is to provide the player with an opportunity to win a large award bonus. The game awards the player the large award bonus if the player selects the symbols 104 that make up the predetermined winning combination of symbols. The game determines the number of picks or selections available to the player based on the player's bet in the primary game. The game determines if the player met or exceeded the predetermined or preset limit (e.g., the maximum bet) in the primary round. If the player met or exceeded the predetermined limit, the game provides the player the maximum number of picks, if not, the game provides the player a minimum number of picks. For example, in one embodiment the game provides seven total selections 102 in a linear manner and includes four maximum picks (with three minimum picks) and a winning combination of three, twenty credit symbols. It should be appreciated that other manners of displaying the selections 102 (including displaying the plurality of selections 102 in a grid, a circle, a pyramid, etc.) and different combination of maximum and minimum picks (for example 6 maximum picks and 4 minimum picks) are contemplated. It should also be appreciated that different winning combinations (for example three 10 credit symbols 104 or other related symbols) are contemplated.

In one embodiment, game 10 (see FIG. 1B) displays the seven selections 102 as illustrated in FIGS. 4A through 4C.

The game determines that the player exceeded the predetermined limit in the primary game, awards the player with the maximum number of player picks 98 (i.e., 4) for the bonus game, and displays that number of picks in the pick display 96 as illustrated in FIG. 4A.

The player uses his first pick on one of the seven selections 102, revealing the symbol 104 associated with that selection 102 as illustrated in FIG. 4B. In this embodiment, the selected symbol is a ten credit associated with the selection 102 as illustrated. The credit display 92 provides the player's current credits (i.e., 10 credits) and the pick display 96 displays the number of picks remaining in this game (i.e., 3 picks). The player uses his remaining picks 96 on the other selections 102, again revealing the symbols 104 associated with those selections 102 as illustrated in FIG. 4C.

The winning combination for this embodiment is three, twenty credits symbols as provided previously. Since the player did not select the winning combination, the game does not provide the large award to the player. Rather, the game makes the current credits the final total, and awards the final total to the player, terminating the bonus game.

Figure 5A:
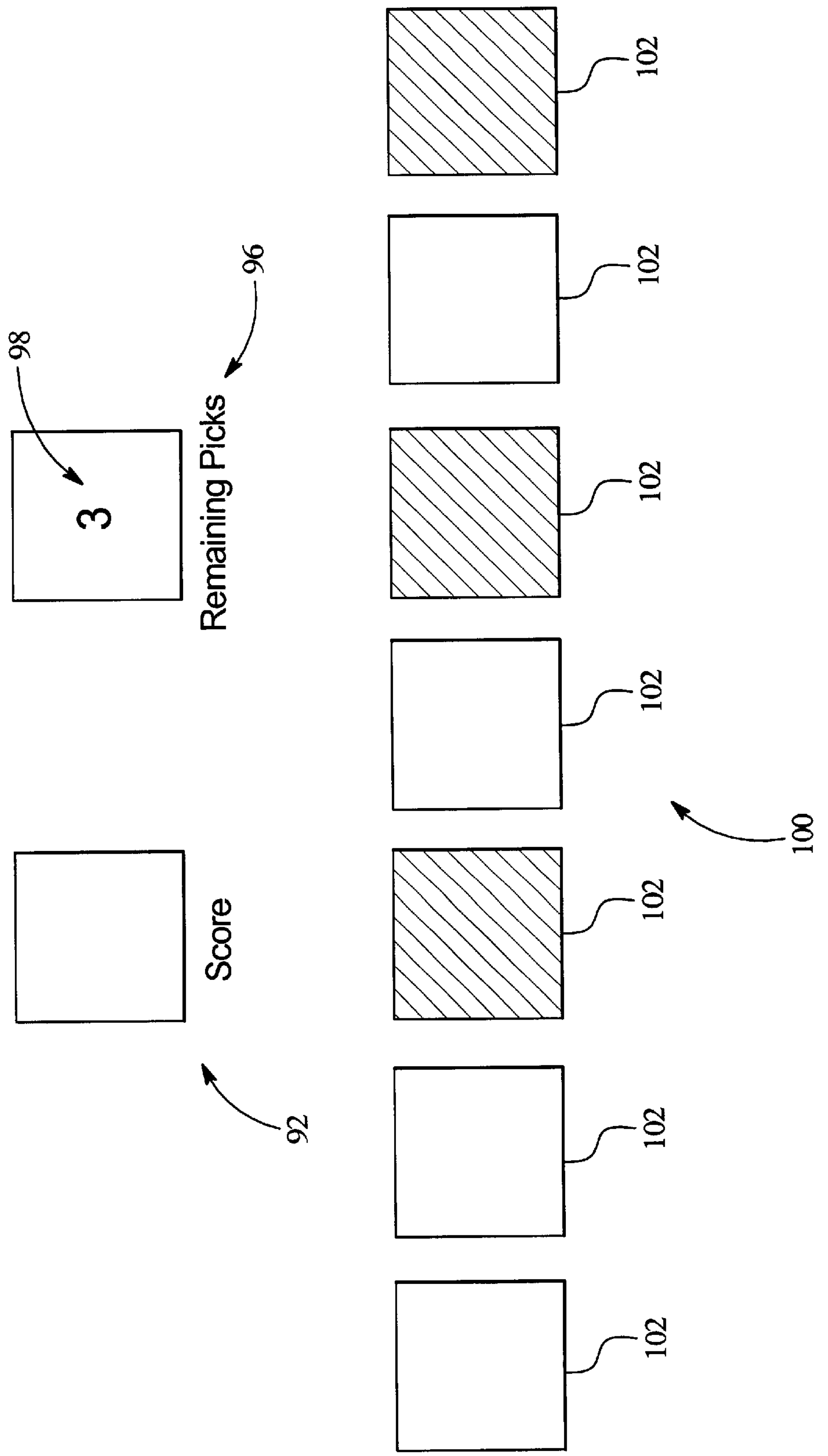
FIGS. 5A, 5B, 5C and 5D are schematic diagrams illustrating a first alternate embodiment of the bonus scheme of FIGS. 4A through 4C.
Figure 5B:
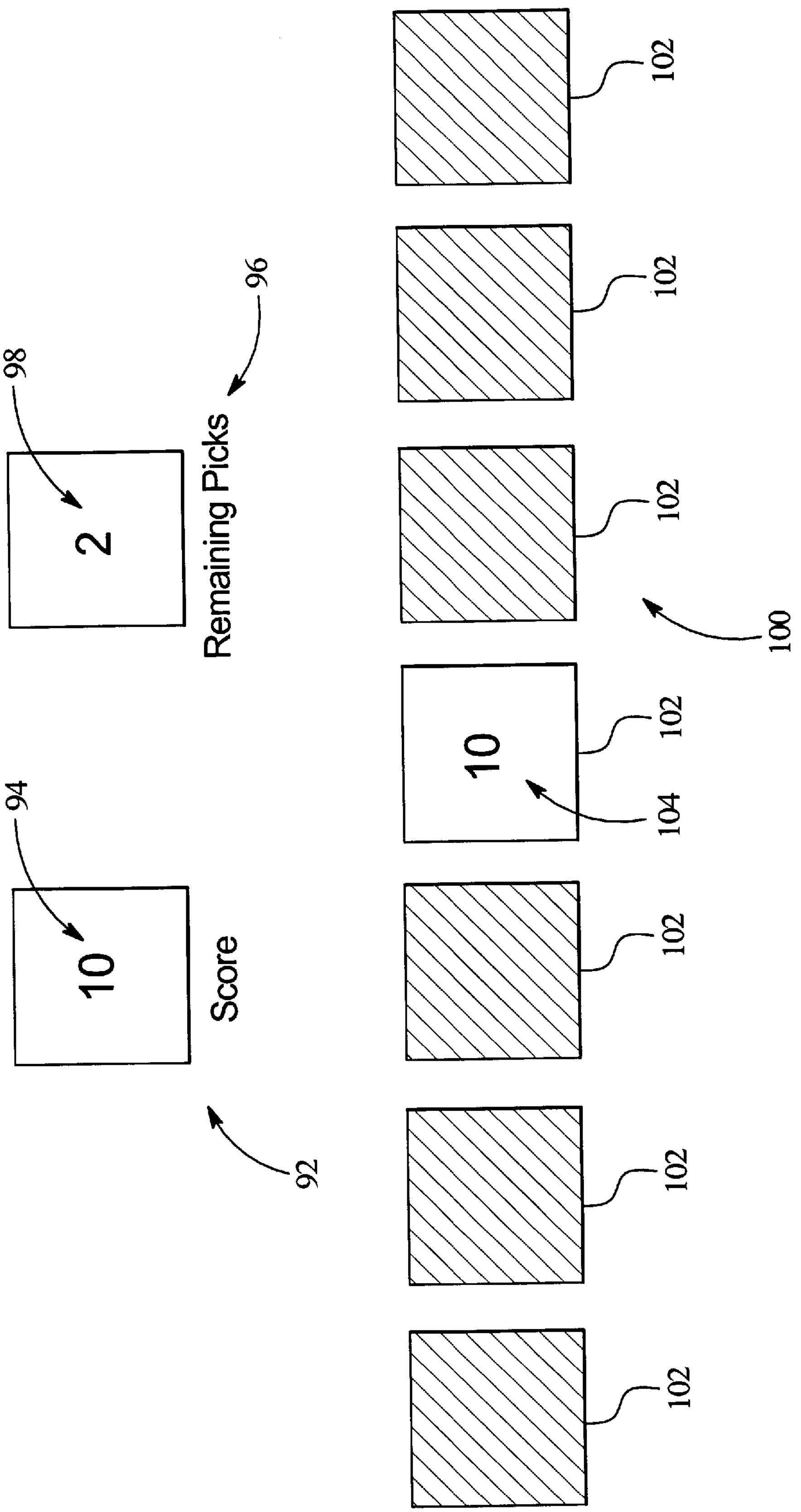

The gaming device enables the player to play the bonus round even if the player did not meet or exceed the predetermined limit in the primary game as illustrated in FIGS. 5A through 5D. In this embodiment, the game provides the minimum number of player picks 98 (i.e., 3 picks) to the player, which is exhibited by the pick display 96 as illustrated in FIG. 5A. Again, the player uses one of his 3 player picks 98, choosing a first selection 102. The selection display 100 provides the symbol 104 associated with such selection 102, in this instance a ten credit as illustrated in FIG. 5B. The credit display 92 displays the player's credit (i.e., 10 credits) and the pick display 96 displays the number of picks remaining in this game (i.e., 2 player picks 98).

Figure 5C:
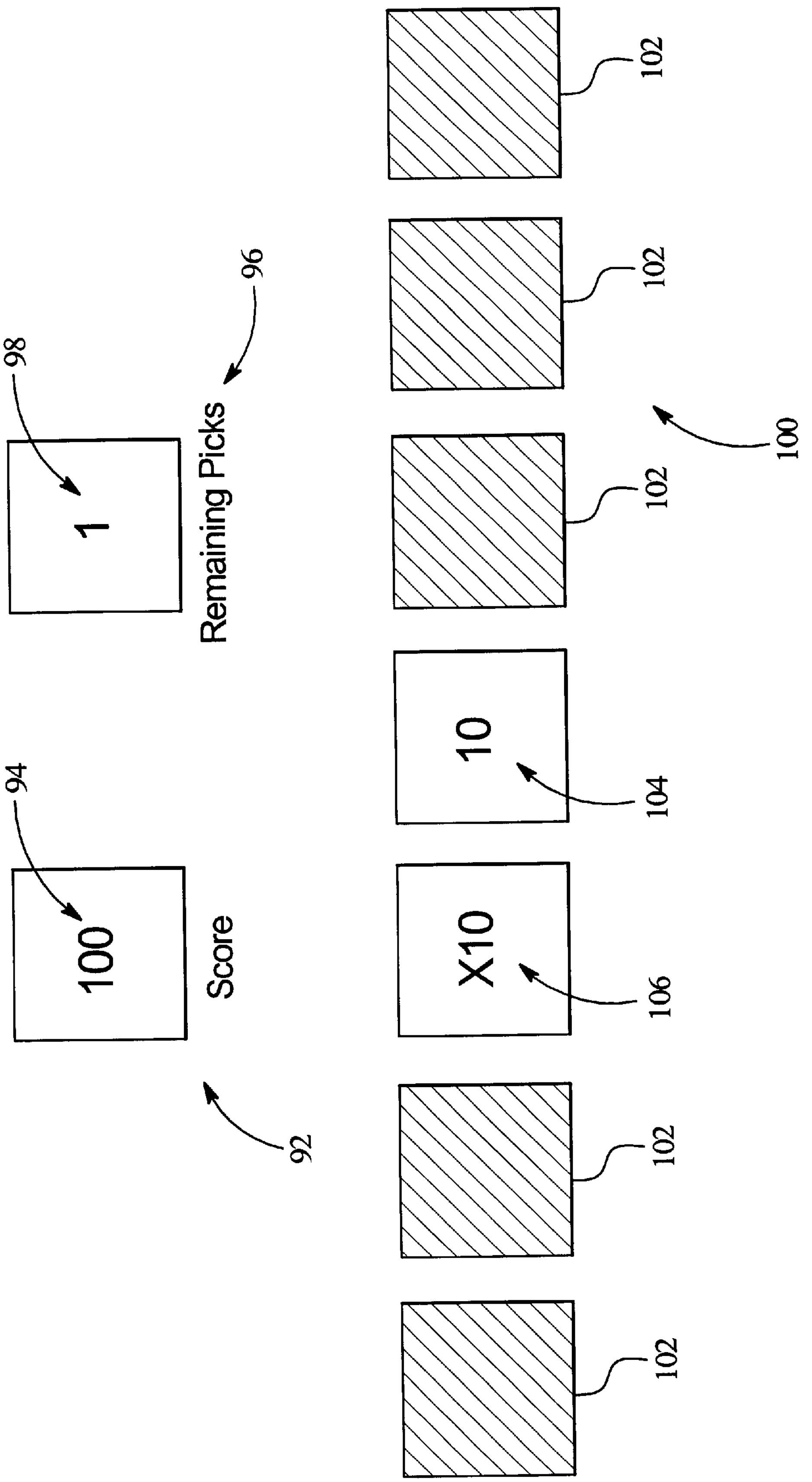

The game enables the player to make another selection 102, reducing the player picks to one as illustrated in FIG. 5C. Selection display 100 again provides the symbol associated with such selection 102. In this instance, the player selects a modifier symbol 106, specifically a X10 symbol. The gaming device uses the modifier symbol 106 to increase or enhance the player's current total credits, here multiplying the player's current total by a factor of ten as illustrated. It is anticipated that modifier 106 could otherwise enhance the player's current credits. Furthermore, other modifiers are contemplated including adding a predetermined amount to the player's score (50 points for example) upon choosing award symbol or modifier symbol 106.

Figure 5D:
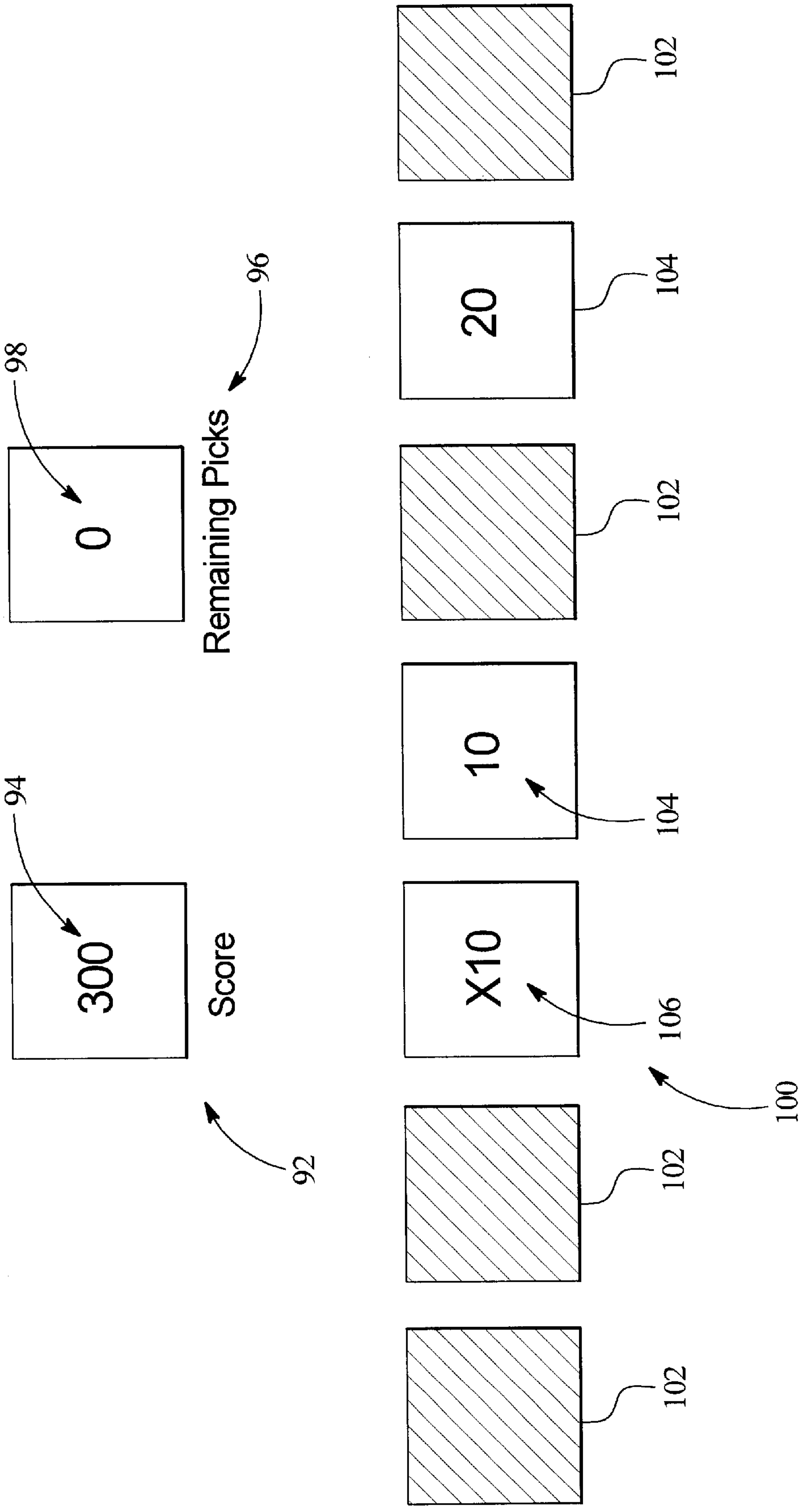

The player makes another selection reducing the player picks to 0. This selection 102 reveals the symbol associated with such selection, here twenty credits as illustrated in FIG. 5D. It should be appreciated that the credit total does not increase by twenty (i.e., equal to the current selection), rather the total increases by two hundred due to the previously selected X10 modifier 106 although the modifier may be applied in any suitable manner as desired by the implementor.

Figure 6A:
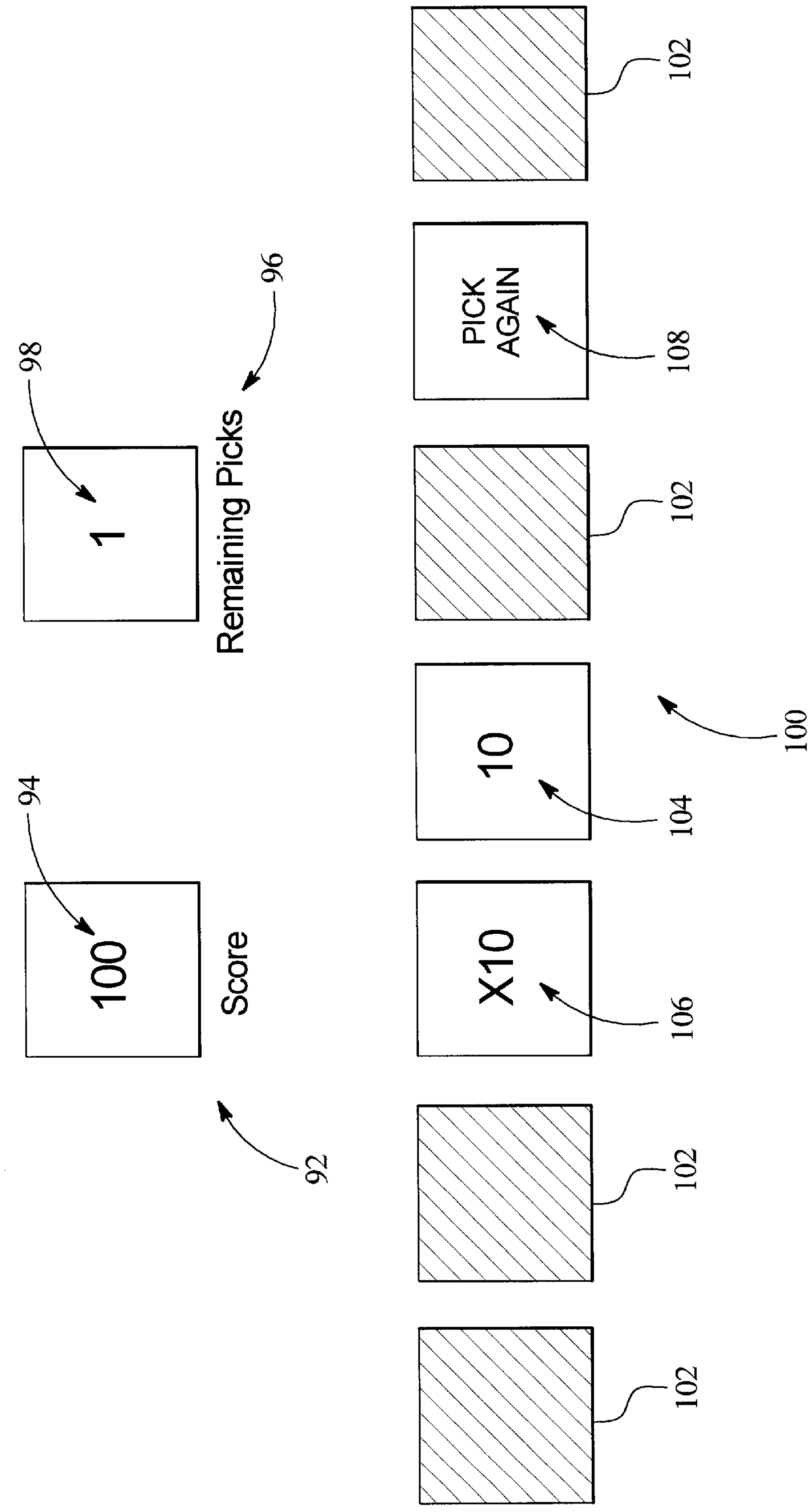
FIGS. 6A and 6B are schematic diagrams illustrating a second alternate embodiment of the bonus scheme of FIGS. 4A through 4C.
Figure 6B:
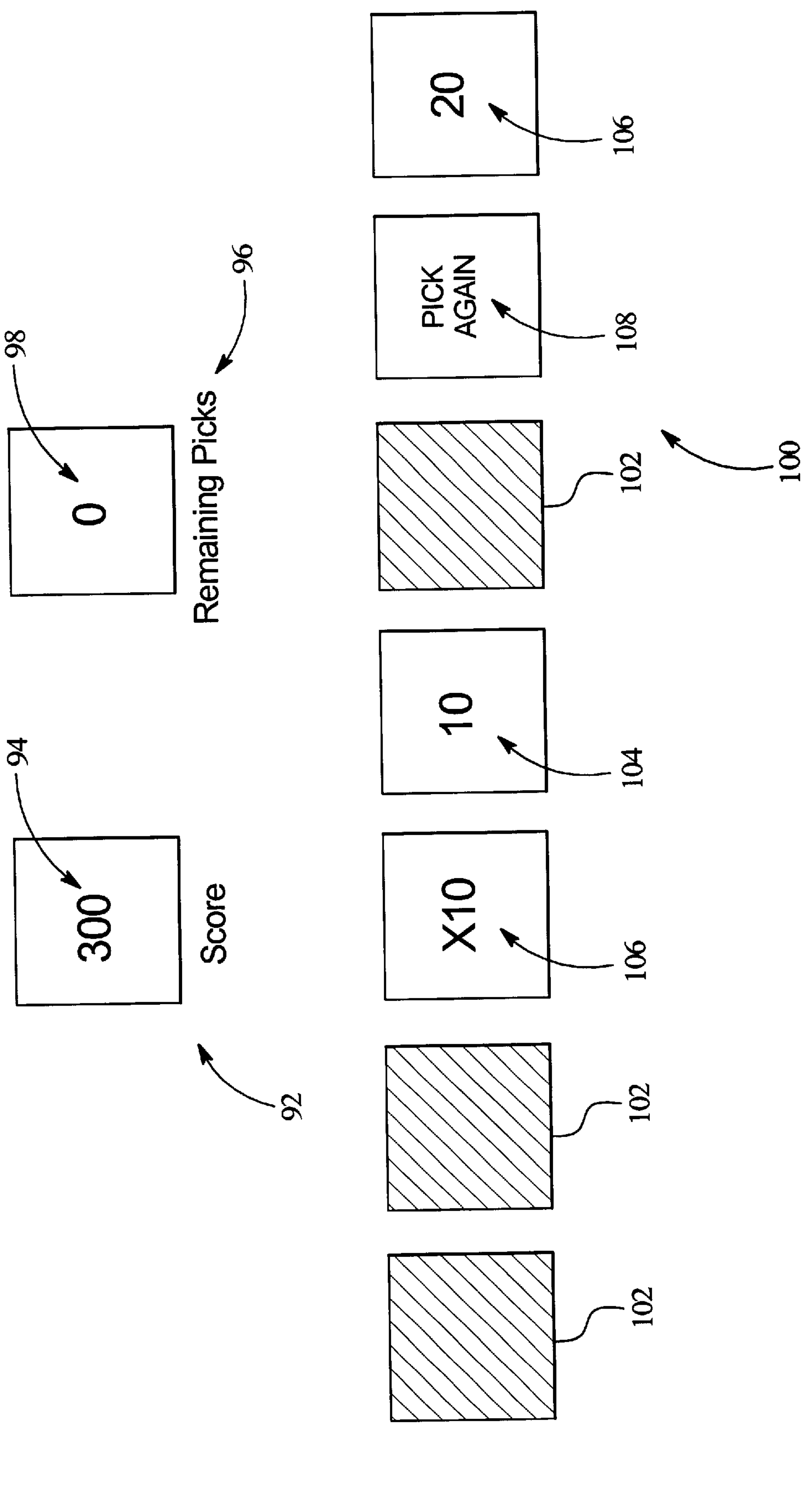

The gaming scheme of gaming device 10 (see FIG. 1B) includes other possible functional symbols 108 associated with the selections as illustrated in FIGS. 6A and 6B. In this embodiment, the player has one player pick 98 remaining and a score of one hundred credits similar to the embodiment illustrated in FIG. 5C discussed previously.

In this game, the player chooses a selection 102, using up what should be his last remaining player pick 98. The selection display 100 provides a "pick again" symbol illustrated in FIG. 6A, enabling the player to choose another selection 102 as illustrated in FIG. 6B. It is anticipated that the gaming scheme may provide other function symbols 108 such as a "lose a pick" symbol. Further, it is anticipated that the award symbols 108 could display other indicia (such as pictures, triangles, squares, etc.) which might represent a bonus value or play awarded by the player.

Figure 7:
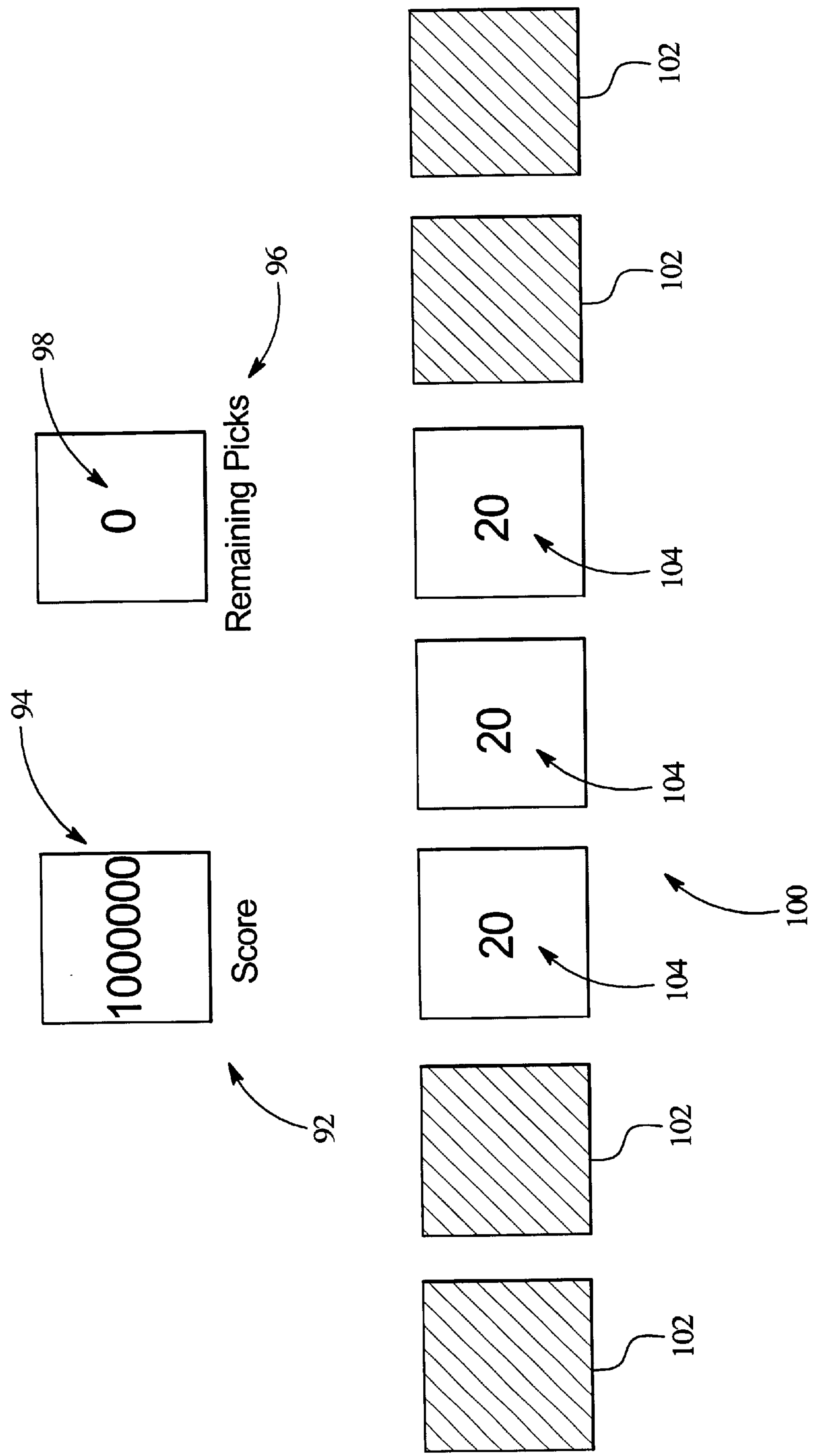
FIG. 7 is a schematic diagram of a third alternate embodiment of the bonus scheme of the present invention.

An alternative embodiment of the bonus scheme is illustrated in FIG. 7. In this embodiment, the player chooses three 20 credit points or bonus values that comprise the winning combination, winning the bonus game. The bonus game displays the winning combination in the display area 100 and the 1,000,000 credits 94 in the credit display 92. In this embodiment, the bonus scheme makes the current total the final total and awards the bonus points to the player. The gaming device either terminates the bonus round, awarding the 1,000,000 credits to the player for use in the primary game or terminates both the bonus and primary game, enabling the player to cash out.

Figure 8:
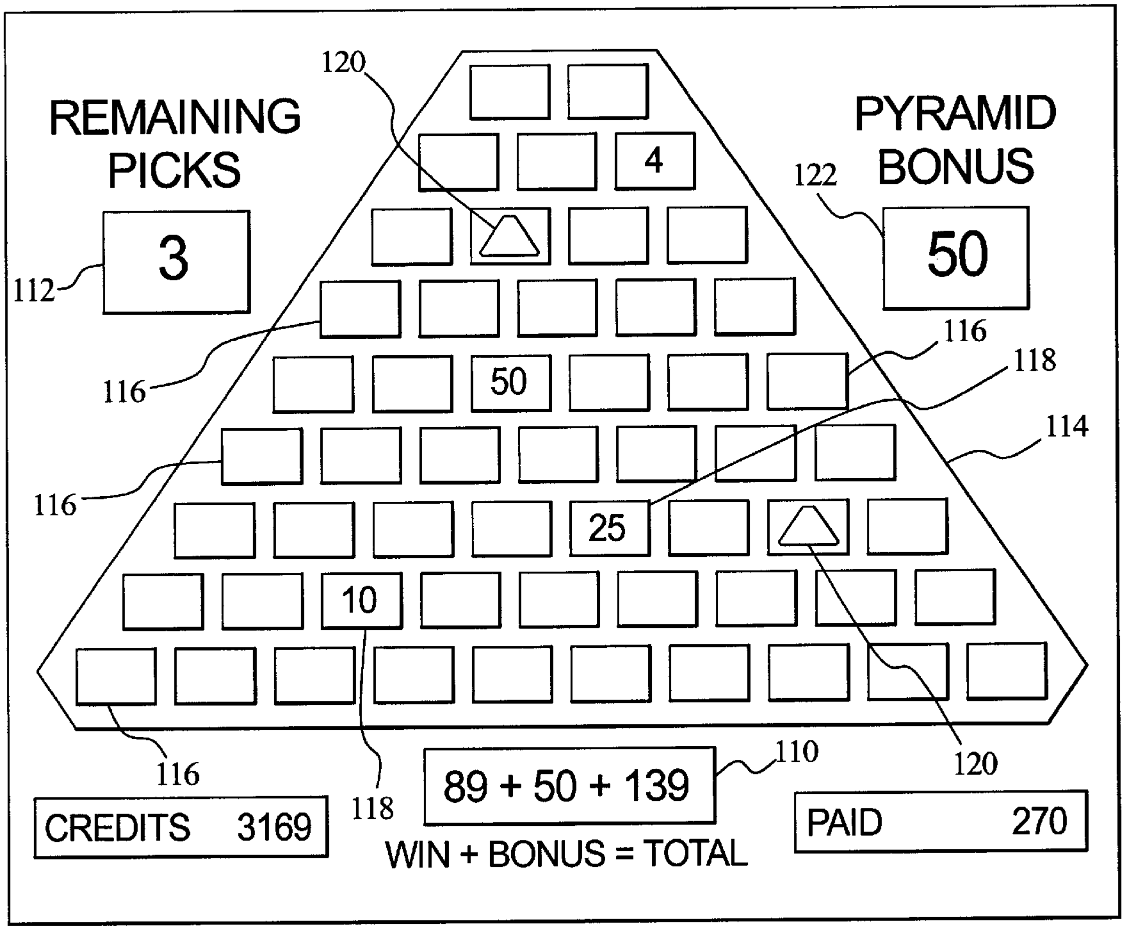
FIG. 8 is a front elevation view of a further alternative embodiment of the bonus scheme of the present invention.

One preferred embodiment of the bonus scheme is illustrated in FIG. 8. The displayed scheme includes a plurality of display areas or displays preferably provided by display 32. The displays preferably include: (i) a bonus credit display 110, which provides the player's current credits; (ii) a remaining picks display 112, which provides the number of picks remaining to the player; and (iii) the selection display 114, which displays the selections 116 and different types of symbols 118 as illustrated.

In this embodiment, the selection display 114 provides a plurality of selections 116 (54 total selections are displayed), in an ascending (upward pointing) format forming a truncated pyramid (i.e., the first layer comprises ten selections 116, the second layer comprises nine selections 116, the third layer comprises eight selections 116, etc.) as illustrated in FIG. 8. It should be appreciated that other manners of displaying the selections 116 are contemplated, including a downward pointing pyramid, a circle, a box, etc.

Again, the purpose of the game is to provide the player with an opportunity to win a large award or jackpot. The gaming scheme awards the player the large award if the player selects all of the award symbols that make up the predetermined winning combination. The gaming scheme determines the number of picks or choices available to the player based on the player's bet in the primary game. The gaming scheme determines if the player met or exceeded a predetermined limit (i.e., the maximum bet) in the primary round. If the player met or exceeded the predetermined limit, the gaming scheme provides the player the maximum number of picks, if not, the gaming scheme provides the player the minimum number of picks.

The player uses his first pick on one of the selections 116, revealing the symbol associated with that selection as illustrated. In this embodiment, the selected symbol is 10 credits associated with the selection as illustrated. The credit display 110 provides the player's current credits and the pick display displays the number of picks remaining. The player uses his remaining picks on the other selections 116, again revealing the symbols 118 associated with those selections as illustrated. It is anticipated that this preferred embodiment includes a display 122 that exhibits only the bonus credits associated with the award symbols (i.e., the pyramid symbols). Every time the player selects a pyramid he is awarded a predetermined number of credits. In one preferred embodiment, the first pyramid is worth 25, the second 25, the third 50, the fourth 150, the fifth 250, the sixth 4500 and the seventh 995,500 credits.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:

a primary wagering game including a wager limit and at least one wager less than the wager limit;

a secondary game which includes a plurality of player selectable selections, a plurality of value symbols associated with said selections, a plurality of award symbols associated with said selections, a winning combination of award symbols, and a jackpot award associated with said winning combination of award symbols;

a display device adapted to display the selections, value symbols and award symbols to a player; and a processor which controls the primary and secondary games, and operable with the display device during the secondary game, to provide the player a number of selections from said plurality of player selectable selections at least equal to the number of award symbols if the player wagered the wager limit in the primary game, to provide the player a number of selections from said plurality of player selectable selections which is less than the number of award symbols in said winning combination of award symbols if the player wagered less than the wager limit in the primary game, to provide a value to the player when the player chooses each of the selections having an associated value symbol, to accumulate the award symbols when the player chooses each selection having an associated award symbol, and to provide the player the jackpot award when the accumulated award symbols reach said winning combination of award symbols.

2. The gaming device of claim 1, which includes at least one functional symbol associated with one of the selections.

3. The gaming device of claim 2, wherein the functional symbol changes the total number of the player's selections.

4. The gaming device of claim 1, which includes a player selection confirmation indication connected to the processor which enables the player to confirm the selections chosen by the player.

5. The gaming device of claim 4, wherein the activation of said player selection confirmation indication enables the player to confirm the players selections after the player chooses all of the player's selections before the selections are revealed.

6. A gaming device comprising:

a base game including at least one wager limit and at least one wager less than the wager limit;

a bonus game triggered upon the occurrence of a triggering event in the base game, said bonus game including a plurality of player selectable selections, a plurality of value symbols associated with said selections, a plurality of award symbols associated with said selections, a winning combination of award symbols and an award associated with said winning combination of award symbols;

a display device adapted to display the selections, value symbols and award symbols to a player;

a player selection indicator which enables the player to choose the selections;

a player selection confirmation indication which enables the player to confirm the player's chosen selections; and a processor which controls the base and bonus games, communicates with the display device, the selection indicator and the selection confirmation indication wherein during the bonus game, provides the player a number of selections from said plurality of player selectable selections at least equal to the number of award symbols if the player wagered the wager limit in the base game, provides the player a number of selections less than the number of award symbols if the player wagered less than the wager limit in the base game, provides a value to the player when the player chooses and confirms each of the selections having an associated value symbol, accumulates the award symbols when the player chooses and confirms each selection having an associated award symbol, and provides the player the award when the accumulated award symbols reach said winning combination of award symbols.

7. The gaming device of claim 6, which includes at least one functional symbol associated with one of the selections.

8. The gaming device of claim 7, wherein the functional symbol changes the total number of the players selections.

9. The gaming device of claim 6, wherein the activation of said player selection confirmation indication enables the player to confirm the players selections after the player chooses all of the players selections.

10. A method of operating a bonus round of a gaming device, said method comprising the steps of:

(a) associating a plurality of value symbols and a plurality of award symbols with a plurality of selections and displaying said selections;

(b) enabling a player to choose a number of the selections at least equal to the number of said award symbols lithe player wagered a wager limit in a base game;

(c) enabling the player to choose a number of the selections from said plurality of selections less than the number of award symbols if the player wagered less than the wager limit in the base game;

(d) providing the player an award symbol if the chosen selection is associated with one of said award symbols and accumulating said award symbol;

(e) providing the player a value if the chosen selection has an associated value symbol; and (f) providing the player a jackpot award based upon the accumulated award symbols matching a winning combination of award symbols.

11. The method of claim 10, which is operated through a data network.

12. The method of claim 11, wherein the data network is an internet.

13. A method of operating a bonus round of a gaming device, said method comprising the steps of:

(a) associating a plurality of value symbols and a plurality of award symbols with a plurality of selections and displaying said selections;

(b) enabling a player to choose a number of the selections at least equal to the number of said award symbols if the player wagered a wager limit in a base game;

(c) enabling the player to choose a number of the selections from said plurality of selections less than the number of award symbols if the player wagered less than the wager limit in the base game;

(d) enabling the player to confirm the chosen selections;

(e) providing the player an award symbol if the chosen selection is associated with one of said award symbols and accumulating said award symbol;

(f) providing the player a value if the chosen selection has an associated value symbol; and (g) providing the player a jackpot award upon the accumulation of the award symbols matching a winning combination of award symbols.

14. The method of claim 13, wherein said gaming device enables the player to confirm the chosen selections after the player chooses all of the players selections.

15. The method of claim 13, which is operated through a data network.

16. The method of claim 13, wherein the data network is an internet.

* * * * *

UNITED STATES PATENT AND TRADEMARK OFFICE

CERTIFICATE OF CORRECTION

PATENT NO. : 6,749,504 B2
DATED : June 15, 2004
INVENTOR(S) : Andrea C. Hughs-Baird It is certified that error appears in the above-identified patent and that said Letters Patent is hereby corrected as shown below:

Column 12,
Line 43, change "lithe" to -- if the --.

Signed and Sealed this

Sixteenth Day of November, 2004

JON W. DUDAS
*Director of the United States Patent and Trademark Office*